(12) United States Patent
Paulsen

(10) Patent No.: US 9,155,932 B1
(45) Date of Patent: Oct. 13, 2015

(54) BICYCLE WITH RESISTANCE ARM EXERCISE

(71) Applicant: Adam Paulsen, Houston, TX (US)

(72) Inventor: Adam Paulsen, Houston, TX (US)

( * ) Notice: Subject to any disclaimer, the term of this patent is extended or adjusted under 35 U.S.C. 154(b) by 133 days.

(21) Appl. No.: 14/024,089

(22) Filed: Sep. 11, 2013

Related U.S. Application Data

(60) Provisional application No. 61/699,490, filed on Sep. 11, 2012.

(51) Int. Cl.
*A63B 22/12* (2006.01)
*A63B 22/06* (2006.01)
*A63B 69/16* (2006.01)

(52) U.S. Cl.
CPC .................................. *A63B 22/0605* (2013.01)

(58) Field of Classification Search
CPC .............. A63B 23/0476; A63B 22/06; A63B 22/0605; A63B 2022/0611; A63B 2022/0617; A63B 21/015; B26K 21/06; B26K 21/16; B26K 21/26; B62M 1/10; B62M 1/12; B62M 1/14
USPC ......... 74/551.4; 280/249, 217; 482/57, 61–62
See application file for complete search history.

(56) References Cited

U.S. PATENT DOCUMENTS

| | | | |
|---|---|---|---|
| 3,966,201 A * | 6/1976 | Mester | 482/72 |
| 4,071,235 A * | 1/1978 | Zent | 482/62 |
| 4,733,880 A | 3/1988 | Wilhelm, III | |
| 4,741,527 A | 5/1988 | Nestegard | |
| 5,328,195 A | 7/1994 | Sommer et al. | |
| 5,511,810 A | 4/1996 | Tong | |
| 5,653,663 A | 8/1997 | McCahon | |
| 5,980,431 A * | 11/1999 | Miller, Jr. | 482/57 |
| 6,840,892 B1 * | 1/2005 | Wu | 482/51 |
| 7,083,551 B1 * | 8/2006 | Lassanske et al. | 482/61 |
| 7,172,532 B2 * | 2/2007 | Baker | 482/57 |
| 2009/0156371 A1 * | 6/2009 | Goldberg | 482/62 |
| 2010/0009815 A1 * | 1/2010 | Chen et al. | 482/63 |
| 2010/0071501 A1 | 3/2010 | Lane | |

* cited by examiner

*Primary Examiner* — Loan H Thanh
*Assistant Examiner* — Megan Anderson
(74) *Attorney, Agent, or Firm* — Robert C. Montgomery; Montgomery Patent & Design, LP

(57) ABSTRACT

A bicycle with arm resistance exercise features incorporated into a handlebar portion comprises a frame, a pair of wheels, and a pair of pedals. The bicycle utilizes crankshaft-style rotatable handle bars which enable a user to exercise their arms while riding and steering the bicycle. The rotating handlebars include a tensioning mechanism to increase the difficulty of the rotation and further increase the complexity of the exercise.

16 Claims, 3 Drawing Sheets

BICYCLE WITH RESISTANCE ARM EXERCISE

RELATED APPLICATIONS

The present invention was first described in and claims the benefit of U.S. Provisional Application No. 61/699,490, filed Sep. 11, 2012, the entire disclosures of which are incorporated herein by reference.

FIELD OF THE INVENTION

The present invention relates to a bicycle having a resistance-type exercise device residing with a handlebar assembly.

BACKGROUND OF THE INVENTION

Everyone is thinking much smarter these days. We are always looking for better ways to improve our quality of life and our health with dieting and exercise. This is especially so due to our busy lifestyles. We have limited time, and it seems that the time is becoming more and more limited. In order to combat a sedentary lifestyle, it is imperative that we not only eat right and exercise but do it efficiently. Maximizing the results and minimizing time is paramount with this goal. One (1) of the most popular forms of exercise is bicycling. However, a disadvantage of this form of exercise is the relatively non-use of the arms. Typical bicycles do a good job of developing muscles and working out the legs; however, bicycles have no capacity to work out upper bodies as well. Accordingly, there exists a need for a means by which a bicycle can provide a lower body workout as well as an upper body workout. The development of the present invention fulfills this need.

The present invention provides a means to engage the cyclist in a full body workout. The device comprises a bicycle having a rotational handle-bar portion. The cyclist has the same pedaling capabilities as a traditional bicycle, but the handle bars also have the same cycling functions in smaller rotation to exercise the arms. Tensioning mechanisms afford a user the ability to increase or decrease the amount of force required to rotate the handlebars, thus provide a means to control the exercise.

Prior art in this field consists of bicycle having motioning handlebar portions and stationary exercise machines resembling bicycles with arm training apparatuses. Bicycles with motioning handlebars focus on either assisting the driving of the bicycle or providing wider range of motion of the handlebars themselves. In either situation, the motion of the handlebars is inconsistent with the motion of the present invention's handlebars and fails to provide the training and exercise that the present invention's does. While drive-assist motioning of the handlebars of the prior art provides a workout, this is not the intent of such motion; therefore, such motioning fails to accomplish the goal of exercising as efficiently and effectively as the present invention does. Furthermore, prior art fails to provide a means to disengage the motioning of the handlebars so as to enable normal bicycle operation. Some prior art exercise machines resembling bicycles are equipped with rotating handlebars specifically designed to work the arms while simulating cycling. These machines lack the ability to act modes of transport. It is an object of this invention to provide both a means of transport and a means to maximize a workout. It is a further object of this invention to provide an ergonomic configuration conducive for cycling and exercising the upper arms. It is a further objective of this invention to enable control of the effectiveness of the upper body exercise mode of the apparatus. It is a further objective of this invention to enable full disengagement, or arrestment, of the rotational motion of the handlebars so as to operate the bicycle in a normal cycling mode.

SUMMARY OF THE INVENTION

The apparatus comprises a bicycle structure with a functional handlebar section. The bicycle structure comprises a common framework, having a truss configuration, front and rear forks, an adjustable and removable seat, and removable front and rear tires. The framework is equipped with a pedal assembly that acts as a drive train for at least one (1) wheel of the bicycle. The front forks are rotably attached to the framework and placed into mechanical connection with the handlebars. The handlebars not only enable steering of the front wheel but the bars also rotate independently in a circular manner. This rotation affords the ability to exercise the user's arms while cycling.

The handlebars are equipped with a tensioning mechanism to set a degree of resistance for a user while exercising the arms. The handlebars may also be locked into a stationary position. The handlebars comprise two (2) angled members rotatingly affixed with each other via a flywheel assembly. Each member has an ergonomic shape and is provided with a hand grip. Adjustment knobs enable control and manipulation of the tensioning mechanism. In alternate embodiments, the apparatus is equipped with various other accessories, such as wheel fenders, a kick-stand, a bottle holder, breaking mechanisms.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
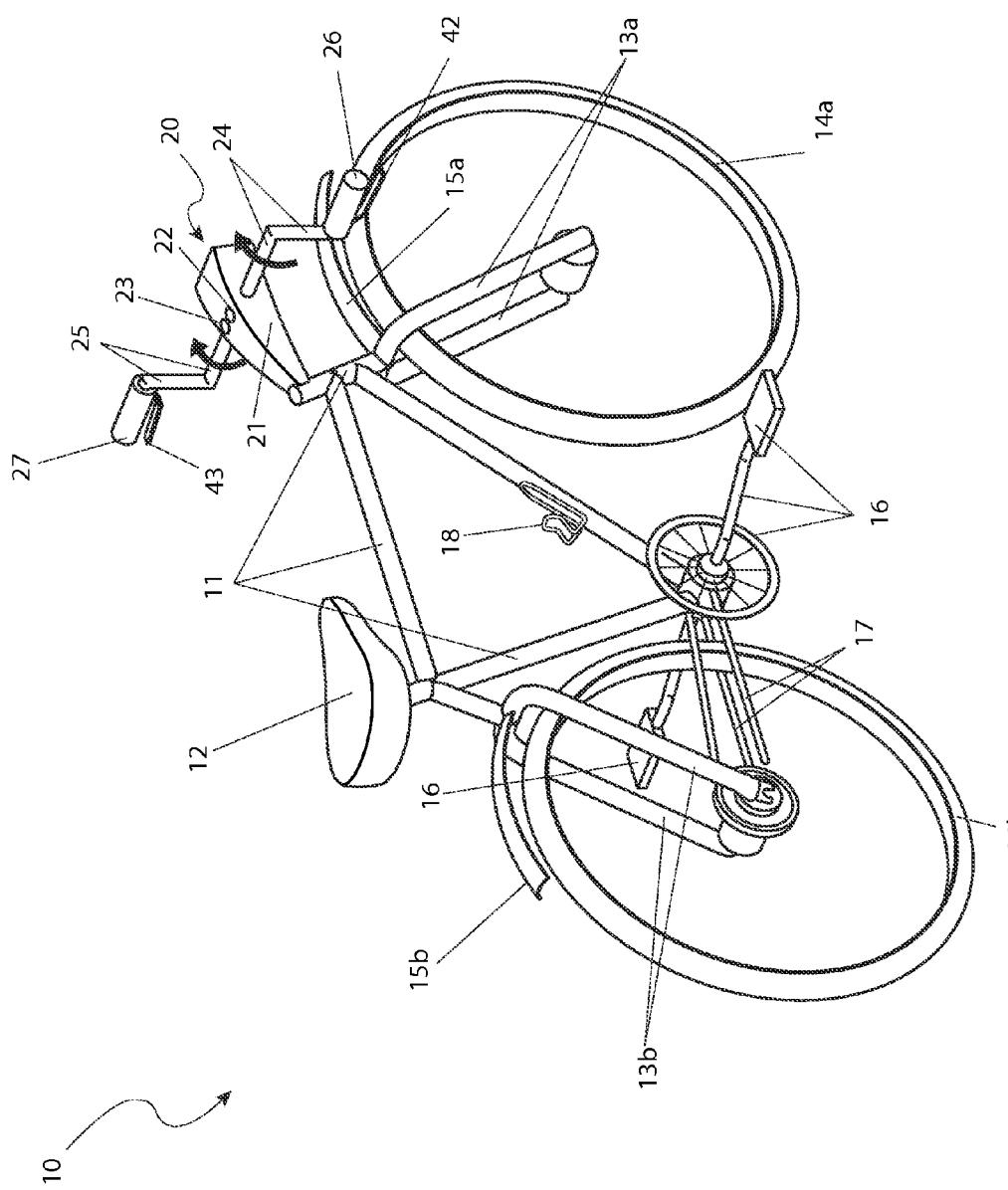
FIG. 1 is a perspective view of a bicycle with resistant arm exercise 10, according to a preferred embodiment of the present invention.

DESCRIPTIVE KEY 10 bicycle with resistant arm exercise
11 bicycle frame
12 seat
13a front fork
13b rear fork
14a front wheel assembly
14b rear wheel assembly
15a front fender
15b rear fender
16 pedal/crank assembly
17 kickstand
18 bottle holder
20 arm cycling mechanism
21 housing
22 first tensioning knob
23 second tensioning knob 24 right handlebar
25 left handlebar
26 right hand grip
27 left hand grip
28 first flywheel
29 second flywheel
30 first friction device
31 second friction device
31a spring
31b friction pad
42 right brake lever
43 left brake lever
44 master cylinder
45 first rotary seal
47 second rotary seal
48 brake line
50 bearing
52 slave cylinder
54 brake cable

DETAILED DESCRIPTION OF THE PREFERRED EMBODIMENT

Figure 2:
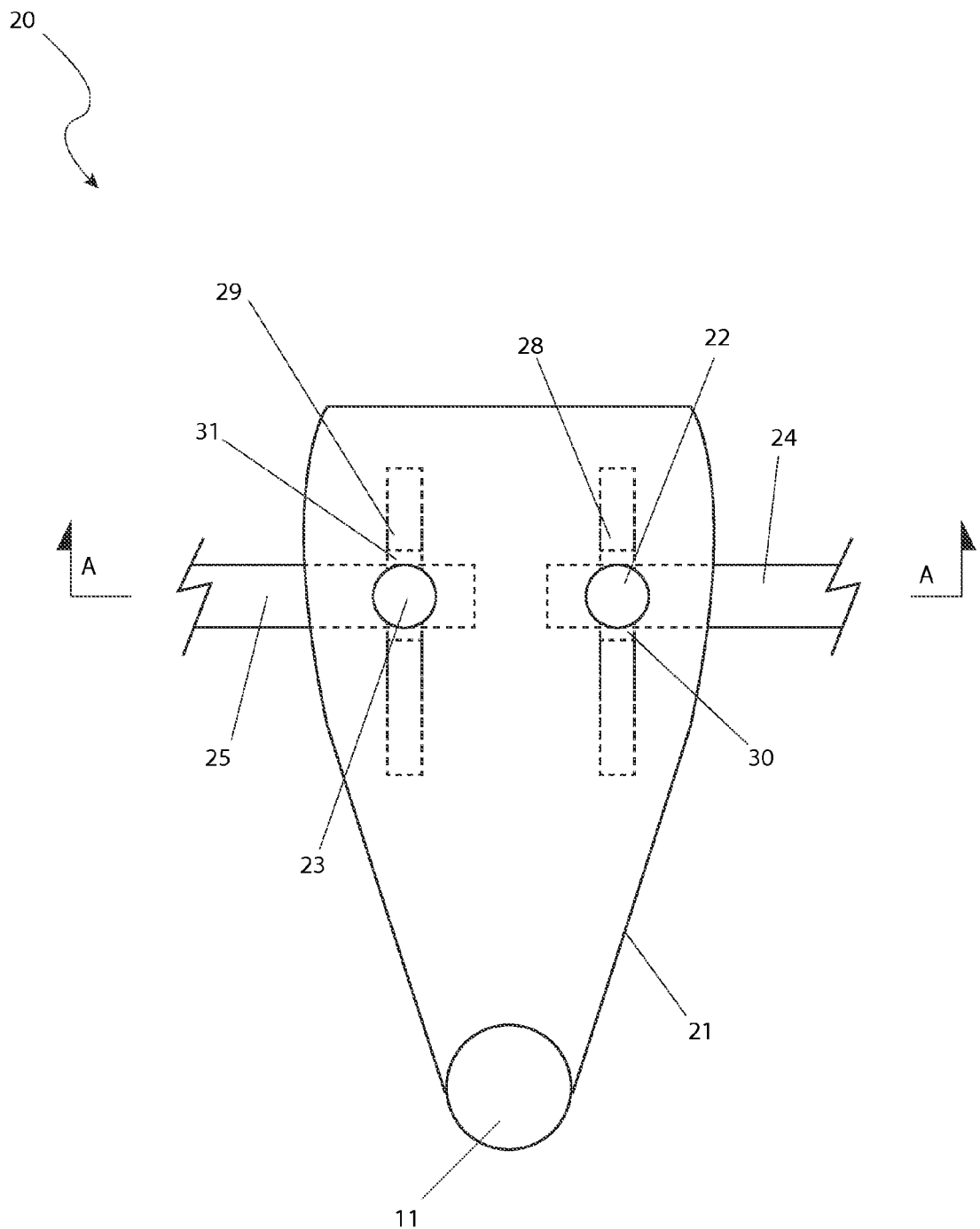
FIG. 2 is a top view of an arm cycling mechanism 20 portion of the bicycle with resistant arm exercise 10, according to a preferred embodiment of the present invention: and, FIG. 3 is a sectional view of an arm cycling mechanism portion 20 taken along section line A-A (see FIG. 2), according to a preferred embodiment of the present invention.
Figure 3:
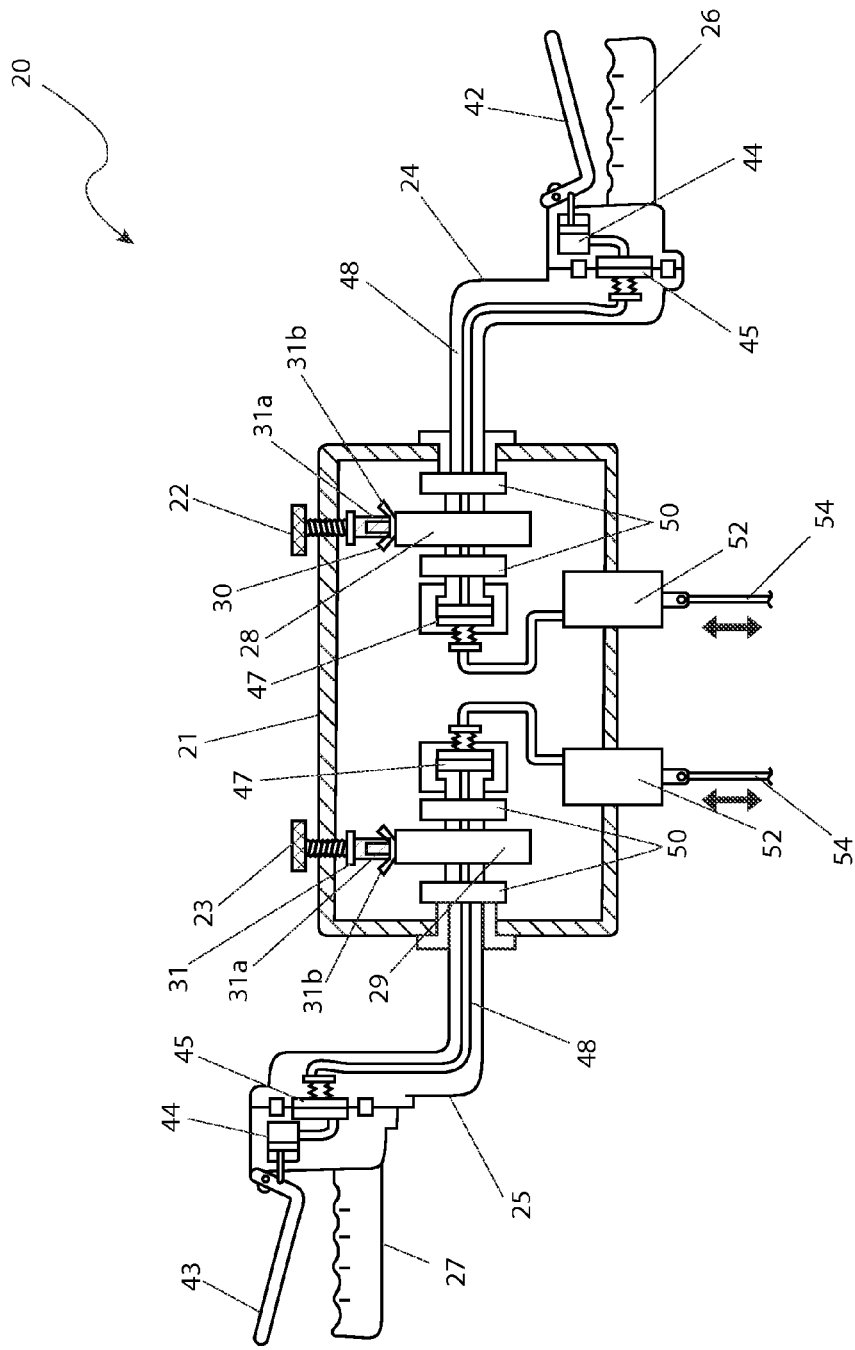

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a bicycle with resistant arm exercise (herein described as the "apparatus") 10, which provides a means for exercising. The apparatus 10 comprises a common bicycle structure with an enhanced arm cycling mechanism 20.

Referring now to FIG. 1, a perspective view of the apparatus 10, according to the preferred embodiment of the present invention, is disclosed. The apparatus 10 takes a form of a bicycle having a typical tubular bicycle frame 11 providing a conventional truss configuration to support a rider. The bicycle frame 11 is envisioned to be fabricated from a light weight durable material such as, but not limited to: aluminum alloy, carbon fiber, or the like. Sections of the bicycle frame 11 are positioned under an upright seat 12 and under the arm cycling mechanism 20, and are envisioned to comprise flexible members and/or shock absorbing features to ease the ride of the apparatus 10. The seat 12 comprises a padded cushion and is envisioned to comprise a quick release device for removal or adjustment. The bicycle frame 11 is fastened to a front wheel assembly 14a and a rear wheel assembly 14b via a pair of respective front fork 13a and rear fork 13b portions. The wheel assemblies 14a, 14b may comprise types such as, but not limited to: road tires, off-road tires, or the like. The various designs and styles of the wheel assemblies 14a, 14b are based upon various intended riding terrain and the needs of the rider. The forks 13a, 13b provide steering and balancing functions to the apparatus 10, and the wheel assemblies 14a, 14b enable said apparatus 10 to travel. The wheel assemblies 14a, 14b rotate via a centrally located pedal/crank assembly 16 integrated into a lower portion of the frame 11 which being common to bicycles. The frame 11 enables one (1) of the wheel assemblies 14a, 14b to be connected to the pedal/crank assembly 16 preferably using a chain mechanism. The pedal/crank assembly 16 is driven by the rider's feet rotating said pedal/crank assembly 16 in a circular fashion which simultaneously rotates the wheel assemblies 14a, 14b. In at least one (1) embodiment, a rearward motion of the pedal/crank assembly 16 provides a braking force to either wheel assembly 14a, 14b as is commonly applied.

The steering of the apparatus 10 is provided by the arm cycling mechanism 20 which comprises a housing 21, a pair of tensioning knobs 22, 23, a right handlebar 24, and a left handlebar 25. The arm cycling mechanism 20 enables the rider to rotate the handlebars 24, 25 to exercise their arms while coincidentally being utilized to steer the apparatus 10. The arm cycling mechanism 20 operates in an offset crankshaft manner enabling the rider to rotate the handlebars 24, 25 in either a simultaneous pedaling manner or in an out of phase manner with regards to the motion of the pedal/crank assembly 16. The apparatus 10 provides a means of variable rotational resistance of the handlebars 24, 25 via user-selectable right friction device 30 and left friction device 31 portions. The handlebars 24, 25 are also envisioned to be utilized in a fixed and motionless state by tightening the friction devices 30, 31, thereby enabling the rider to utilize the handlebars 24, 25 in a traditional steering manner.

The apparatus 10 is envisioned to also comprise various accessories which enable riding to be more pleasurable such as, but not limited to: a front fender 15a, a left fender 15b, a bottle holder 18, and a kickstand 17. Located between each fork 13a, 13b and above each wheel assembly 14a, 14b is a fender 15a, 15b to protect the rider from debris, water, or the like during riding. The fenders 15a, 15b are envisioned to be fabricated from metal or plastic materials. The bottle holder 18 is attached to the bicycle frame 11 to enable placement of an existing beverage bottle. Although the bottle holder 18 is depicted as be positioned upon a down tube portion of the bicycle frame 11, it is known that other convenient locations may be utilized with out limiting the scope of the invention. A lower portion of the bicycle frame 11 comprises a double kickstand 17 to enable the apparatus 10 to maintain an upright position while parked. The kickstand 17 preferably comprises a "V"-shaped design which pivots downwardly to engage the ground surface upon both sides of the bicycle frame 11 to support the weight of the apparatus 10.

The wheel assemblies 14a, 14b are envisioned to utilize conventional cable-type braking mechanisms to stop the rotation of the wheel assemblies 14a, 14b. Various existing brake devices such as disc brakes can be utilized as dependant upon riding conditions and terrain as well as manufacturing cost considerations. The right 24 and left 25 handlebars comprise respective right brake lever 42 and a left brake lever 43 portions being operably located upon respective right hand grip 26 and left hand grip 27 portions to enable an effective stopping means (see FIG. 3).

Referring now to FIG. 2, a top view of the arm cycling mechanism 20, according to the preferred embodiment of the present invention, is disclosed. The housing portion 21 of the arm cycling mechanism 20 is located between the right handlebar 24 and the left handlebar 25 comprising a box structure made using a material similar to the bicycle frame 11. The right handlebar 24 and left handlebar 25 comprise respective first friction device 30 and second friction device 31 portions located within the housing 21. The friction devices 30, 31 act to vary a rotational force required to rotate each handlebar 24, 25, via adjustment of respective external tensioning knobs 22, 23. The friction devices 30, 31 comprise respective spring 31a and friction pad 31b portions. The tensioning knobs 22, 23 act upon the spring portion 31a of the friction devices 30, 31, which in turn exert a downward force upon the respective friction pad 31b. The friction pads 31b are in direct contact with the rotating metallic flywheels 28, 29. Rotating the tensioning knobs 28, 29 threadingly inward causes the friction devices 30, 31 to provide an increased resistance to the rotation of said flywheels 28, 29, and conversely, rotating the tensioning knobs 28, 29 threadingly outward causes the friction devices 30, 31 to provide less resistance to the rotation of said flywheels 28, 29. The friction devices 32, 33 independently adjust a rotational tension of each handlebar 24, 25 using respective externally accessible tensioning knobs 22, 23. The adjusting of the friction devices 30, 31 increases or decreases the rotation of respective internal flywheels 28, 29 thereby increasing or decreasing the force a rider must exert during the exercise (also see FIG. 3).

It is envisioned that other crankshaft configurations could be utilized without limiting the scope of the invention. It is also understood that other devices could be used in lieu of a crankshaft type device to rotate the handlebars 24, 25 without limiting the scope of the invention.

Referring now to FIG. 3, a sectional view of the arm cycling mechanism portion 20 taken along section line A-A (see FIG. 2), according to a preferred embodiment of the present invention, is disclosed. The housing 21 provides an attachment means to the right handlebar 24 and left handlebar 25 portions, being rotatingly secured and supported by respective pairs of first bearings 50 located within the housing 21. Outer end portions of the right handlebar 24 and the left handlebar 25 comprise comfortable and ergonomically designed right hand grip 26 and left hand grip 27 portions, respectively. Said hand grip portions 26, 27 provide rotary motion with respect to respective handlebar portions 24, 25 via an internal second bearing 51, thus allowing a user to freely motion the handlebars 24, 25 in a circular pattern while maintaining a stationary grip upon said grips 26, 27.

The handlebars 24, 25 provide respective axial attachment to the first flywheel 28 and second flywheel 29 portions within the housing 21. The resistance of rotation for the right handlebar 24 is adjusted by a first tensioning knob 22 which in turn acts upon the first friction device 30 and first flywheel 28 portions, and the resistance of rotation for the left handlebar 25 is adjusted by a second tensioning knob 23 which in turn acts upon the second friction device 31 and second flywheel 29 portions. Said tensioning knobs 22, 23 are in mechanical communication with the respective first 30 and second 31 friction devices which in turn act upon respective side surface portions of the cylindrical flywheels 28, 29.

Tightening the tensioning knobs 22, 23 to an extreme position is envisioned to fix the handlebars 24, 25 in the motionless state to provide a traditional steering function. Each handlebar 24, 25 may be independently rotated by the user being synchronous with a pedaling motion, out of phase with the pedaling motion, or other desired motion, based upon a user's preference.

The hand grip portions 26, 27 of each handlebar 24, 25 further comprise respective right brake lever 42 and left brake lever 43 portions which may be utilized to actuate brake mechanisms at the wheels 14a, 14b to stop the apparatus 10. Said brake levers 42, 43 preferably comprise respective corresponding hydraulic braking circuits which interface with traditional cable-type braking mechanisms at respective wheel assembly portions 14a, 14b. Each brake lever 42, 43 is in mechanical and hydraulic communication with respective assembled hydraulic components mounted to the housing 21 including a master cylinder 44, a first rotary seal 45, a second rotary seal 47, a plurality of interconnecting brake lines 48, and a slave cylinder 52. The hydraulic components 44, 45, 47, 52 conduct hydraulic fluid pressure between relative rotating portions including the hand grips 26, 27, the handlebars 24, 25, and the housing 21, and to produce a linear motion from an output shaft portion of each respective slave cylinder 52. The output shaft portions of each slave cylinder 52 are mechanically connected to respective front 14a and rear 14b wheel assemblies via conventional bicycle brake cables 54.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of utilizing the apparatus 10 may be achieved by performing the following steps: acquiring the apparatus 10; sitting upon the seat 12; retracting the kickstand 17 to its stowed state; positioning an existing beverage bottle within the bottle holder 18 as desired; gripping the hand grips 26, 27 to steer the apparatus 10; adjusting the tensioning knobs 22, 23 to rotate the handlebars 24, 25 with a desired amount of rotational resistance; utilizing the pedal/crank assembly 16 to drive the wheel assemblies 14a, 14b; utilizing the fenders 15a, 15b to protect a user from debris or water; and, utilizing the apparatus 10 for normal transportation as well as for arm exercise purposes afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:
1. A bicycle, comprising:
   a frame comprising a plurality of tubular members;
   a seat removably attached and adjustable relative to said frame;
   a front wheel attached to said frame with a pair of front forks;
   a rear wheel attached to said frame with a pair of rear forks;
   a drive train operably connected to either said front wheel or said rear wheel;
   a pedal assembly operably connected to and driving said drive train;
   at least one hand braking assembly attached to said frame for retarding motion of said front wheel or said rear wheel;
   a handlebar assembly, comprising:
      a housing attached to said frame above said pair of front forks;

a first handlebar extending outwardly from a first side of said housing and rotatingly attached thereto;

a second handlebar extending outwardly from a second side of said housing opposite said first side and rotating attached thereto;

an arm cycling mechanism located within said housing in mechanical communication with each of said first and second handlebars; and, wherein said frame is configured to support an operator;

wherein said handlebar assembly operably controls said pair of front forks;

wherein said arm cycling mechanism enables said operator to independently rotate said first and second handlebar in order to provide an exercising action to arms of said operator; and, wherein said arm cycling mechanism is selectively secured so as to disable said exercising action.

2. The bicycle of claim 1, wherein:

said first handlebar further comprises:
- a first shaft having a first end rotatingly attached to a first handlebar bearing located within said housing; and,
- a first hand grip rotatingly attached to a first hand grip bearing located within a second end of said first shaft; and, said second handlebar further comprises:
- a second shaft having a first end rotatingly attached to a second handlebar bearing located within said housing; and,
- a second hand grip rotatingly attached to a second hand grip bearing located within a second end of said second shaft.

3. The bicycle of claim 2, wherein said arm cycling mechanism further comprises:

a first tensioning knob located on said housing;

a first friction device located within said housing and operably controlled by said first tensioning knob;

a second tensioning knob located on said housing;

a first flywheel operably controlled by said first handlebar;

a second friction device located within said housing and operably controlled by said second tensioning knob;

a second flywheel operably controlled by said second handlebar;

wherein said first tensioning knob provides a selectable first torque required to rotate said first flywheel and said first handlebar by motioning said first friction device against or away from said first flywheel;

wherein said second tensioning knob provides a selectable second torque required to rotate said second flywheel and said second handlebar by motioning said second friction device against or away from said second flywheel.

4. The bicycle of claim 3, wherein said at least one braking assembly further comprises:

a first brake lever located on said first handlebar adjacent to said hand grip, said first brake lever operably controlling a brake mechanism to retard movement of either said first or second wheel.

5. The bicycle of claim 4, wherein said at least one braking assembly further comprises:

a second brake lever located on said second handlebar adjacent to said hand grip, said second brake lever operably controlling a brake mechanism to retard movement of an opposite one of either said first or second wheel.

6. The bicycle of claim 3, further comprising:

a front fender attached to said pair of front forks, extending outwardly and above said front wheel; and, a rear fender attached to said pair of rear forks, extending outwardly and above said rear wheel.

7. The bicycle of claim 3, further comprising a bottle holder attached to said frame.

8. The bicycle of claim 3, further comprising at least one kickstand.

9. The bicycle of claim 2, wherein said first and second handlebars each extend outwardly from said housing in an offset manner.

10. A bicycle, comprising:

a frame comprising a plurality of tubular members;

a seat removably attached and adjustable relative to said frame;

a front wheel attached to said frame with a pair of front forks;

a rear wheel attached to said frame with a pair of rear forks;

a drive train operably connected to either said front wheel or said rear wheel;

a pedal assembly operably connected to and driving said drive train, further having a pedal braking assembly for retarding motion of said front wheel or said rear wheel;

a handlebar assembly, comprising:
- a housing attached to said frame above said pair of front forks;
- a first handlebar extending outwardly from a first side of said housing and rotatingly attached thereto, comprising:
  - a first shaft having a first end rotatingly attached to a first handlebar bearing located within said housing; and,
  - a first hand grip rotatingly attached to a first hand grip bearing located within a second end of said first shaft;
- a second handlebar extending outwardly from a second side of said housing opposite said first side and rotating attached thereto, comprising:
  - a second shaft having a first end rotatingly attached to a second handlebar bearing located within said housing; and,
  - a second hand grip rotatingly attached to a second hand grip bearing located within a second end of said second shaft;
- an arm cycling mechanism located within said housing in mechanical communication with each of said first and second handlebars, comprising:
  - a first tensioning knob located on said housing;
  - a first friction device located within said housing and operably controlled by said first tensioning knob;
  - a second tensioning knob located on said housing;
  - a first flywheel operably controlled by said first handlebar;
  - a second friction device located within said housing and operably controlled by said second tensioning knob; and,
  - a second flywheel operably controlled by said second handlebar; and, wherein said frame is configured to support an operator;

wherein said handlebar assembly operably controls said pair of front forks;

wherein said arm cycling mechanism enables said operator to independently rotate said first and second handlebar in order to provide an exercising action to arms of said operator;

wherein said first tensioning knob provides a selectable first torque required to rotate said first flywheel and said first handlebar by motioning said first friction device against or away from said first flywheel;

wherein said second tensioning knob provides a selectable second torque required to rotate said second flywheel and said second handlebar by motioning said second friction device against or away from said second flywheel; and, wherein said arm cycling mechanism is selectively secured so as to disable said exercising action.

11. The bicycle of claim 10, further comprising at least one hand braking assembly comprising:

a first brake lever located on said first handlebar adjacent to said hand grip, said first brake lever operably controlling a brake mechanism to retard movement of either said first or second wheel.

12. The bicycle of claim 11, wherein said at least one hand braking assembly further comprises:

a second brake lever located on said second handlebar adjacent to said hand grip, said second brake lever operably controlling a brake mechanism to retard movement of an opposite one of either said first or second wheel.

13. The bicycle of claim 10, wherein said first and second handlebars each extend outwardly from said housing in an offset manner.

14. The bicycle of claim 10, further comprising:

a front fender attached to said pair of front forks, extending outwardly and above said front wheel; and, a rear fender attached to said pair of rear forks, extending outwardly and above said rear wheel.

15. The bicycle of claim 10, further comprising a bottle holder attached to said frame.

16. The bicycle of claim 10, further comprising at least one kickstand.

* * * * *